United States Patent
Yoo et al.

(10) Patent No.: US 9,286,376 B2
(45) Date of Patent: Mar. 15, 2016

(54) APPARATUS AND METHOD FOR PROCESSING A MULTIDIMENSIONAL STRING QUERY

(75) Inventors: Sanghyun Yoo, Seoul (KR); Kyoung-Gu Woo, Seoul (KR); Young-Seok Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 744 days.

(21) Appl. No.: 13/488,728

(22) Filed: Jun. 5, 2012

(65) Prior Publication Data

US 2013/0185328 A1    Jul. 18, 2013

(30) Foreign Application Priority Data

Jan. 18, 2012    (KR) .................. 10-2012-0005843

(51) Int. Cl.
 *G06F 17/30*    (2006.01)
(52) U.S. Cl.
 CPC ................. *G06F 17/30622* (2013.01)
(58) Field of Classification Search
 CPC ............ G06F 17/30707; G06F 17/30861; G06F 19/22; G06F 17/30622
 See application file for complete search history.

(56) References Cited

U.S. PATENT DOCUMENTS

| | | | |
|---|---|---|---|
| 6,353,826 B1 * | 3/2002 | Seputis | |
| 7,257,566 B2 * | 8/2007 | Danielson | G06Q 40/00 705/12 |
| 7,593,957 B2 * | 9/2009 | Biedenstein et al. | |
| 7,792,840 B2 | 9/2010 | Whang et al. | |
| 2003/0182101 A1 * | 9/2003 | Lambert | 704/1 |
| 2004/0177065 A1 * | 9/2004 | Tropf | 707/3 |
| 2004/0267713 A1 * | 12/2004 | Chaudhuri et al. | 707/3 |
| 2006/0101004 A1 * | 5/2006 | Matsubayashi et al. | 707/3 |
| 2009/0043721 A1 * | 2/2009 | Reznik et al. | 706/20 |
| 2010/0241622 A1 | 9/2010 | Jin et al. | |

FOREIGN PATENT DOCUMENTS

| | | |
|---|---|---|
| KR | 10-2007-0024105 | 3/2007 |
| KR | 10-2010-0035949 | 4/2010 |
| KR | 10-2010-0097951 | 9/2010 |
| KR | 10-2010-0105080 | 9/2010 |

* cited by examiner

*Primary Examiner* — Angelica Ruiz
(74) *Attorney, Agent, or Firm* — NSIP Law

(57) ABSTRACT

Provided are an apparatus and method for processing a multidimensional string query. Using the apparatus and method, a search of a multidimensional multi-attribute string may be rapidly processed on the basis of a multidimensional n-gram index.

13 Claims, 7 Drawing Sheets

| 3-GRAM | POSTING LIST SIZE | POSTING LIST |
|---|---|---|
| ... | | ... |
| axx | 77 | $(p_{11}, 8), (p_{11}, 13), (p_{21}, 9), (p_{21}, 25), ...$ |
| | 22 | ... |
| | 125 | ... |
| bcd | 17 | $(p_1, 1), (p_1, 4), (p_4, 32) ...$ |
| | 191 | ... |
| | 52 | ... |
| dbc | 32 | $(p_1, 3), (p_1, 6), (p_2, 5) ...$ |
| | 171 | ... |
| | 32 | ... |
| xxa | 103 | $(p_1, 1), (p_1, 4), (p_2, 3), (p_2, 6) ...$ |
| | 45 | ... |
| | 151 | ... |
| zqz | 13 | $(p_1, 3), (p_2, 5) ...$ |
| | 210 | ... |
| | 33 | ... |
| zzq | 191 | $(p_3, 5), (p_3, 10), (p_7, 22), (p_7, 51) ...$ |
| | 39 | ... |
| | 112 | ... |
| ... | | |

⇑ N-GRAM INDEXING (a)

PATIENT1:

| b | c | d | b | c | d | b | c |
|---|---|---|---|---|---|---|---|
| x | x | a | x | x | a | k | d |
| m | n | z | z | z | a | z | q |

PATIENT2:

| l | i | o | c | d | b | u |
|---|---|---|---|---|---|---|
| k | q | x | x | a | c | a |
| z | q | n | n | z | q | t |

...

APPARATUS AND METHOD FOR PROCESSING A MULTIDIMENSIONAL STRING QUERY

CROSS-REFERENCE TO RELATED APPLICATION(S)

This application claims the benefit under 35 USC §119(a) of a Korean Patent Application No. 10-2012-0005843, filed on Jan. 18, 2012, in the Korean Intellectual Property Office, the entire disclosure of which is incorporated herein by reference for all purposes.

BACKGROUND

1. Field

The following description relates to an apparatus and method for processing a multidimensional string query.

2. Description of the Related Art

Typically a substring query method based on an n-gram is used for a string search. An n-gram is an inverted index structure which may be obtained by dividing words in a document into substrings that have a length of n characters and then storing identifications (IDs) of documents including the substrings along with information about positions in the documents where the substrings are shown.

In an n-gram index, the substrings are connected to posting lists. In general, a query is divided into substrings that have a length of n to generate an n-gram set, and posting lists corresponding to the respective substrings are retrieved, thereby returning final results. In this case, cost increases as the number of n-gram sets increase because a posting list needs to be read per n-gram.

In addition, a general string search method using an n-gram only supports a single dimensional string for a single attribute, and thus cannot be applied to multidimensional multi-attribute data such as medical data of patients.

SUMMARY

In an aspect, there is provided an apparatus for processing a multidimensional string query, the apparatus including an n-gram set generator configured to generate n-gram sets for a multidimensional query, an n-gram set selector configured to select one or more n-gram sets from among the generated n-gram sets based on posting list sizes of a multidimensional n-gram index, a candidate set generator configured to generate a candidate set using posting lists corresponding to the selected n-gram sets, and a refinement processor configured to determine whether the multidimensional query is included in a document, based on the generated candidate set.

The multidimensional query may comprise strings that are expressed in predetermined symbols based on respective attributes.

The predetermined symbols may be designated to one or more respective sections obtained by dividing a range of an actual value of each of the attributes.

The n-gram set selector may be further configured to calculate query processing costs of the generated n-gram sets in order of increasing posting list size, and select the one or more n-gram sets based on the query processing costs.

The query processing costs for a corresponding n-gram may be determined according to a number of page access times to obtain pages from a disk.

The query processing costs may be determined based on a cost for reading posting lists of each n-gram set so as to generate the candidate set or a cost for determining whether a document includes the multidimensional query based on the candidate set.

The candidate set generator may be configured to generate the candidate set by joining the posting lists of one or more of the n-gram sets.

The apparatus may further comprise an n-gram index manager configured to generate and manage the multidimensional n-gram index, and the n-grams of the multidimensional n-gram index may be expressed in predetermined symbols included in one or more respective sections which are obtained by dividing a whole range that an attribute value can have according to respective attributes.

In an aspect, there is provided a method of processing a multidimensional string query, the method including generating n-gram sets for a multidimensional query, selecting one or more n-gram sets from among the generated n-gram sets based on posting list sizes of a multidimensional n-gram index, generating a candidate set using posting lists corresponding to the selected n-gram sets, and determining whether the multidimensional query is included in a document, based on the candidate set.

The multidimensional query may comprise strings that are expressed in predetermined symbols based on respective attributes.

The predetermined symbols may be designated to one or more respective sections obtained by dividing a range of an actual value of each of the attributes.

The selecting the one or more n-gram sets may comprise extracting the posting list sizes from the multidimensional n-gram index, calculating query processing costs of the generated n-gram sets in order of increasing posting list size, and selecting the one or more n-gram sets based on the query processing costs.

The calculating of the query processing costs may comprise inputting n-grams in a priority queue in order of increasing posting list size, and sequentially reading the n-grams from the priority queue one by one and calculating the query processing costs.

The query processing costs for a corresponding n-gram may be determined according to a number of page access times to obtain pages from a disk.

The query processing costs may be determined in consideration of a cost for reading posting lists of each n-gram set so as to generate the candidate set, or a cost for determining whether a document includes the multidimensional query based on the candidate set.

The generating the candidate set may comprise generating the candidate set by joining the posting lists of the one or more n-gram sets.

The n-grams of the n-gram index may be expressed in predetermined symbols designated to one or more respective sections obtained by dividing a whole range that an attribute value can have based on respective attributes.

In an aspect, there is provided a processor for processing a multidimensional string query, the processor including an n-gram generator configured to split the multidimensional string query into n-grams based on attributes of the multidimensional string query, and a comparator configured to compare the generated n-grams to a plurality of documents to determine whether the multidimensional string query is included in one or more of the plurality of documents.

The plurality of documents may be stored in a document database (DB).

The processor may further comprise an n-gram set selector configured to select one or more n-gram sets from the generated n-grams based on cost of processing each of the n-grams, and the comparator may be configured to compare the selected one or more n-gram sets to the plurality of documents to determine whether the multidimensional string query is included in one or more of the plurality of documents.

The processor may further comprise an output unit configured to output the results of the determination performed by the comparator.

Other features and aspects will be apparent from the following detailed description, the drawings, and the claims.

BRIEF DESCRIPTION OF THE DRAWINGS

FIG. 3 is a diagram illustrating an example of generating a multidimensional n-gram index from multidimensional data.

Figure 1:
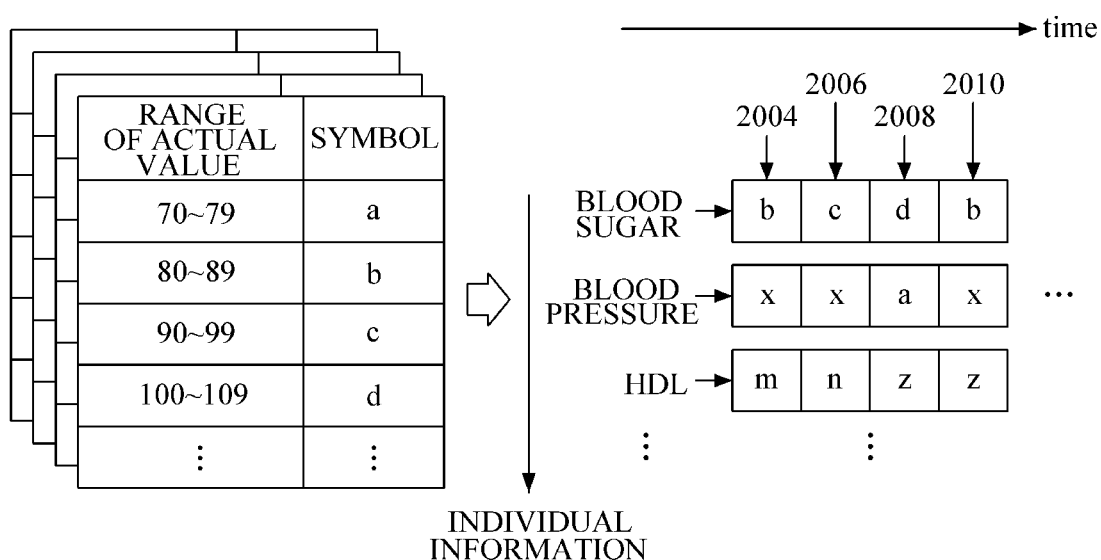
FIG. 1 is a diagram illustrating an example of multidimensional multi-attribute data.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of multidimensional multi-attribute data. The example of FIG. 1 relates to health examination data of people.

Referring to FIG. 1, medical data such as health examination data may include a large amount of patient-specific data on various examination items, for example, blood pressure, blood sugar, weight, disease, and the like, which may be measured and managed with regard to many patients. Medical data of a patient may be periodically measured and managed, and a medical history may be created for that patient. Each examination item of medical data may be defined as an attribute. Accordingly, a patient may include medical data with multi-attributes of data.

This description relates to an apparatus and method that express multi-attribute string data in multiple dimensions with respect to all the attributes and may process a query in the multiple dimensions of data using an n-gram index. Referring to FIG. 1, each attribute of data of a specific patient may be generated as a string consisting of predetermined symbols. On the left side of FIG. 1, a range of an actual value that each attribute can have is divided into predetermined sections, and the respective sections are designated predetermined symbols. On the right side of FIG. 1, strings representing attribute-specific measurement values by symbols of the corresponding range are expressed in multiple dimensions.

For example, blood sugar values of patient 1 measured in 2004, 2006, 2008 and 2010 may be 81, 95, 101 and 83, respectively. Accordingly, a string for a blood sugar attribute of patient 1 is bcdb. Other attributes of patient 1 may also be expressed in the same way. Accordingly, a huge amount of multi-attribute data (e.g., medical data) may be expressed using symbols. The multi-attribute data may be managed so that search speed can be remarkably increased through the use of an n-gram query of multidimensional data.

Figure 2:
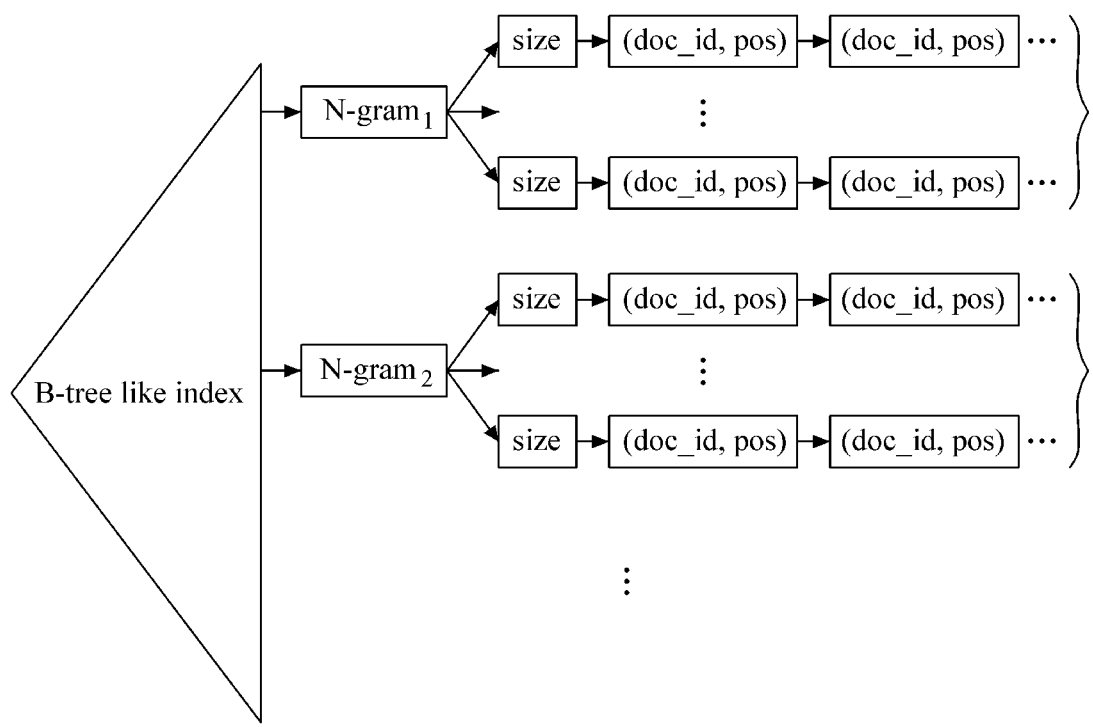
FIG. 2 is a diagram illustrating an example of an extended multidimensional n-gram index.

FIG. 2 illustrates an example of an extended multidimensional n-gram index. FIG. 3 illustrates an example of generating a multidimensional n-gram index from multidimensional data.

Referring to FIG. 2, a multidimensional n-gram index is obtained by extending an n-gram index to multiple dimensions. Accordingly, a search for multidimensional multi-attribute data as shown in FIG. 1 by way of example may be efficiently performed. For example, as many lists as the number of attributes may be connected to each n-gram in a multidimensional n-gram index, unlike in a general n-gram index. Also, a multidimensional n-gram index may include posting list sizes and posting lists according to respective attributes of an n-gram. In various examples, a posting list includes an identification (ID) of a document in which the corresponding n-gram exists, and information on a position in the document. A posting list size may be the number of documents in which the corresponding n-gram exists.

Referring to FIG. 3, (a) is an example of three-dimensional string data expressing data of three attributes (e.g., blood sugar, blood pressure, and weight) of a plurality of documents (e.g., patient 1 $P_1$ to patient n $P_n$) using predetermined symbols. Also, (b) is an example of a multidimensional n-gram (3-gram) index generated by building an n-gram index of the multidimensional string of (a).

For example, in (b) the number of documents (patients) in which a substring (3-gram) "axx" is in a string for a first attribute (e.g., blood sugar) is 77, the number of documents (patients) in which the substring "axx" is in a string for a second attribute (e.g., blood pressure) is 22, and the number of documents (patients) in which the substring "axx" is in a string for a third attribute (e.g., weight) is 125.

Figure 4:
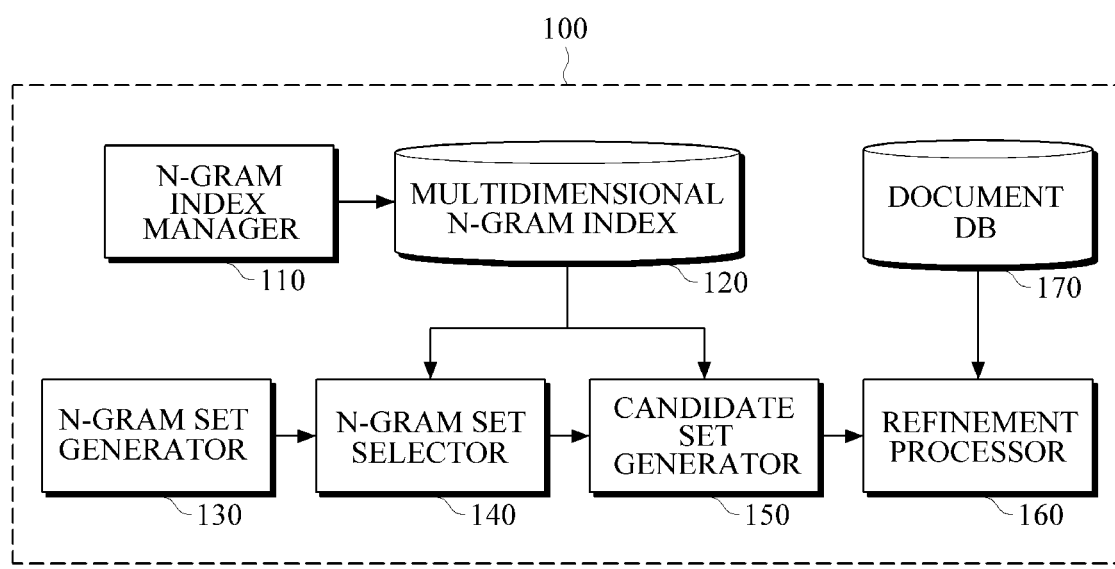
FIG. 4 is a diagram illustrating an example of an apparatus for processing a multidimensional string query.

FIG. 4 illustrates an example of an apparatus for processing a multidimensional string query.

Referring to FIG. 4, apparatus 100 for processing a multidimensional string query includes a multidimensional n-gram index 120, an n-gram set generator 130, an n-gram set selector 140, a candidate set generator 150, a refinement processor 160, and a document database (DB) 170. Apparatus 100 may be or may be included in a terminal, for example, a computer, a mobile phone, a tablet, an appliance, a sensor, and the like.

The n-gram set generator 130 may split a query consisting of a multidimensional string into n-grams based on respective attributes, and generate n-gram sets for all of the attributes. That is, a string in which attribute-specific values are expressed using predetermined symbols may be expressed in multiple dimensions for all of the attributes. For example, attribute values expressed in multiple dimensions may be referred to as a multidimensional query. A multidimensional query may be configured and input by a user or generated by the n-gram set generator 130. For example, if a user wants to input a name of a specific patient and search for medical data of patients that are similar to that of the patient, the n-gram set generator 130 may extract medical data of the patient input by the user, and symbolize the medical data to convert the medical data into a query of a multidimensional string.

The n-gram set selector 140 may select one or more n-gram sets from among all of the n-gram sets based on posting list sizes included in the multidimensional n-gram index 120 that has been generated. For example, the n-gram set selector 140 may calculate a query processing cost of each n-gram set, and select an n-gram set having the minimum query processing cost or a processing cost that satisfies a threshold cost.

As an example, the n-gram set selector 140 may read posting list sizes of all n-grams from the multidimensional n-gram index 120, and prioritize the n-grams in a priority queue in order of increasing posting list size or decreasing posting list size. Then, the n-gram set selector 140 may take the n-grams out of the priority queue one by one and calculate query processing costs for each of the n-grams.

Query processing cost may be determined according to the number of accesses from a disk to a page of a document. For example, query processing cost may be determined according to the number of pages in which the corresponding n-gram exists among all pages of a document. As another example, query processing cost may be determined in consideration of cost for reading posting lists of each n-gram set so as to generate a candidate set. Query processing cost may be determined in consideration of cost for determining an answer document to the query based on the candidate set. For example, an answer document may be a document that includes the multidimensional query.

The candidate set generator 150 may generate a candidate set of results using posting lists of the selected n-gram set. For example, the candidate set may be generated by joining the posting lists of the selected n-gram set, that is, finding an intersection of the respective posting lists. The posting lists are included in the multidimensional n-gram index 120, and may include a document (e.g., patient) IDs and information on positions in the documents where an n-gram exists.

The refinement processor 160 may determine an answer document to the query of the user. For example, the refinement processor may determine a document in which the query exists, based on the candidate set. For example, the refinement processor 160 may compare actual queries in the candidate set documents of the document database (DB) 170, finally determining an answer document in which the query exists. The refinement processor may also be referred to as a comparator.

In addition, the apparatus 100 may further include an n-gram index manager 110. For example, the n-gram index manager 110 may split a symbolized multidimensional multi-attribute string into n-grams, generate a multidimensional n-gram index including attribute-specific posting list sizes and posting list information with respect to the respective n-grams, and perform management, for example, modification and deletion.

The apparatus 100 may also comprise an output unit (not shown) which outputs the results of documents in which the multidimensional query exits. For example, the output unit may include a display, a printer, and the like.

Figure 5:
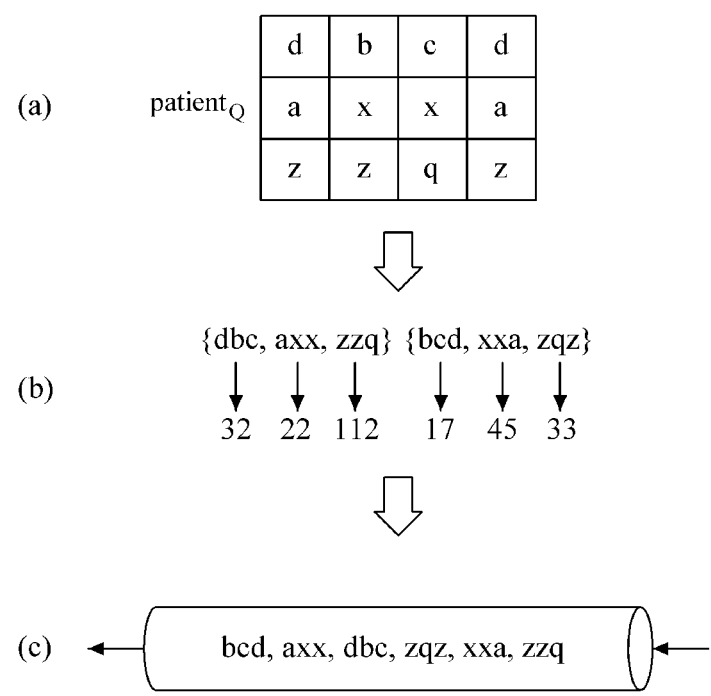
FIG. 5 is a diagram illustrating an example of a procedure for processing a multidimensional query.

FIG. 5 illustrates an example of processing of a three-dimensional query using substrings having a length of three, that is, 3-grams. Referring to FIG. 5, (a) is an example of a three-dimensional query about patient$_Q$. In this example, a string for a first attribute in the query is "dbcd," a string for a second attribute in the query is "axxa," and a string for a third attribute in the query is "zzqz." The n-gram set generator 130 may divide the query into substrings having a length of 3, thereby generating a 3-gram set. As shown, (b) is an example of two 3-gram sets generated by the n-gram set generator 130.

A first set is {dbc, axx, zzq} corresponding to the first 3-gram string taken from the first, second, and third attributes. A second set is {bcd, xxa, zqz} corresponding to the second 3-gram string taken from the first, second, and third attributes.

The n-gram set selector 140 may extract the minimum posting list size from each 3-gram using a three-dimensional 3-gram index, for example, as shown in FIG. 3. In this example, the extracted posting list sizes of {dbc, axx, zzq} and {bcd, xxa, zqz} are {32, 22, 112} and {17, 45, 33}.

For example, the n-gram set selector 140 may input the respective 3-gram strings in a priority queue in order of increasing posting list size, that is, in order of bcd, axx, dbc, zqz, xxa and zzq, as shown in (c).

In this example, the n-gram set selector 140 may sequentially take the 3-grams out of the priority queue of (c) one by one and may calculate query processing costs of the respective 3-grams. The query processing costs may be calculated using Equation 1.

$$\text{Cost}(Q) = f_B\left[\sum_{(g_{i,j}, p_{i,j}) \in Q}(h + l_{i,j} - 1) + \frac{L}{\mu}\prod_{(g_{i,j}, p_{i,j}) \in Q}\frac{|L_{i,j}|}{L}\right]. \quad \text{Equation 1}$$

In Equation 1, ($g_{ij}$, $p_{ij}$) denotes an i-th n-gram of a j-th attribute in a patient query string and a position of the i-th n-gram, h denotes a disk input/output (I/O) cost for obtaining a posting list, $l_{ij}$ denotes a posting list size of $g_{ij}$, $L_{ij}$, denotes a posting list of $g_{ij}$, $f_B$(n) denotes the number of page access times to obtain n pages from a disk using a buffer having a capacity of B, and μ denotes the average size of patient data. Also, Cost(Q) denotes the cost of an n-gram Q taken out of a priority queue.

Referring to the equation above, query processing cost may be calculated in consideration of I/O cost used to read posting lists and I/O cost used to read a record in an actual document according to a generated candidate set.

The n-gram set selector 140 may select an n-gram set that has a cost that satisfies a threshold, for example, the minimum query processing cost calculated using the equation above among all the n-gram sets. Referring to FIG. 5, for example, bcd may first be taken out from the priority queue in which bcd, axx, dbc, zqz, xxa and zzq are located, and cost(Q) is calculated for Q={bcd}. Next, axx may be taken out to calculate cost(Q) for Q={bcd, axx}, and it is checked whether the cost has increased in comparison to the previous cost. Subsequently, cost(Q) is calculated for Q={bcd, axx, dbc}, and it is checked whether the cost has increased in comparison to the previous cost. In this example, query processing costs of all the n-grams are calculated in sequence. Based on the calculations it is determined that cost for Q={bed, axx, dbc} is less than cost for Q={bcd, axx, dbc, zqz} and {bcd, axx, dbc} is selected as a final n-gram set.

The candidate set generator 150 may read posting lists of the selected n-gram set from the multidimensional index 120, and join the posting lists to generate a candidate set. For example, if {bcd, axx, dbc} is selected as a final n-gram set as mentioned above, and posting lists are as shown in [Table 1] below, the generated candidate set may be an intersection of the posting lists, that is, documents {P1, P3}.

For example, each of the n-grams that are selected as the final n-gram set may have information on a dimension in the query and a position, and thus may be expressed as {dbc, axx, ?}, {bcd, ?, ?}, and so on. Here, a sequence within brackets denotes a dimension, and each pair of brackets denotes position information. In this example, a posting list corresponding to a first dimension is obtained according to dbc, a posting list corresponding to a second dimension is obtained according to axx, and a posting list corresponding to the first dimension is obtained according to bcd.

The obtained posting lists may be joined thereafter, and information on positions in documents may be examined. In other words, it is checked whether a position in a document indicated by bcd is the same as a position in a document indicated by axx, and it is checked whether a position in a document indicated by dbc differs from a position in a document indicated by bcd or axx by exactly 1. As a result, when posting lists are joined using [Table 1] below, a candidate set (P1, P3) may be generated because (P1, 4) of bcd is the same as (P1, 4) of axx, and (P3, 33) of dbc differs from (P3, 32) of axx by 1.

TABLE 1

| Selected 3-gram | Posting List |
| --- | --- |
| bcd | (P1, 1), (P1, 4), (P3, 32), . . . |
| axx | (P1, 4), (P3, 32), (P6, 15), . . . |
| dbc | (P1, 3), (P1, 5), (P2, 5), (P3, 33), . . . |

The refinement processor 160 may compare actual queries in the candidate set documents of the document database (DB) 170, to finally determine an answer document in which the query exists. In this example, even if the candidate set documents P1 and P3 have the n-gram, the candidate set documents P1 and P3 may not include the actual query, that is, the whole string. For this reason, to provide correct search results, only a document in which the actual query exists may be selected from the candidate set.

Figure 6:
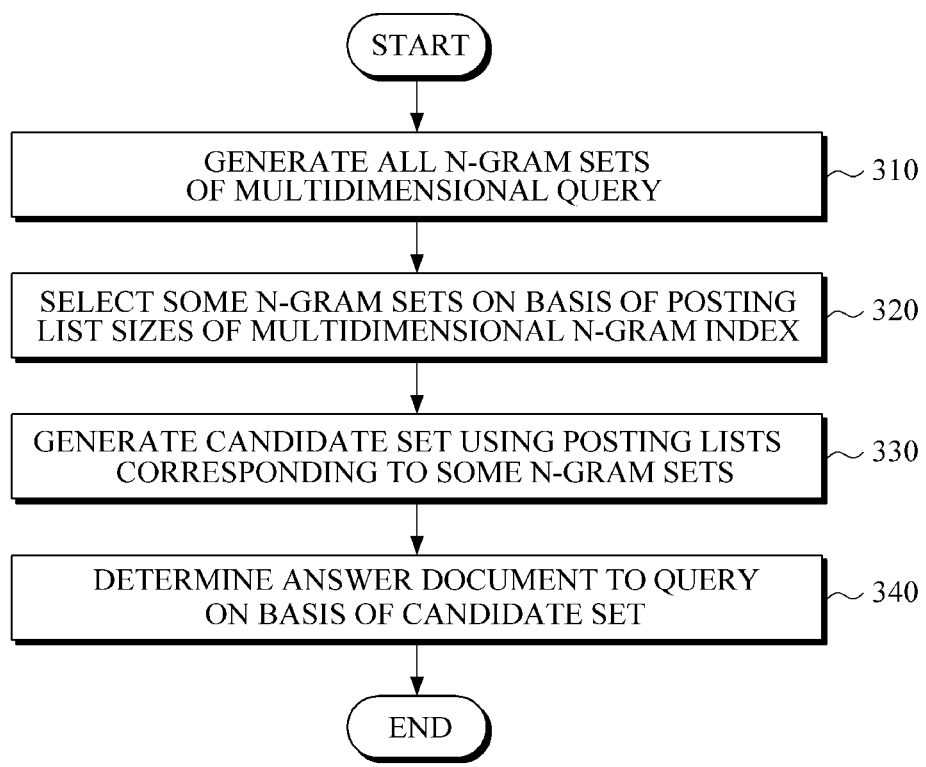
FIG. 6 is a flowchart illustrating an example of a method for processing a multidimensional string query.
Figure 7:
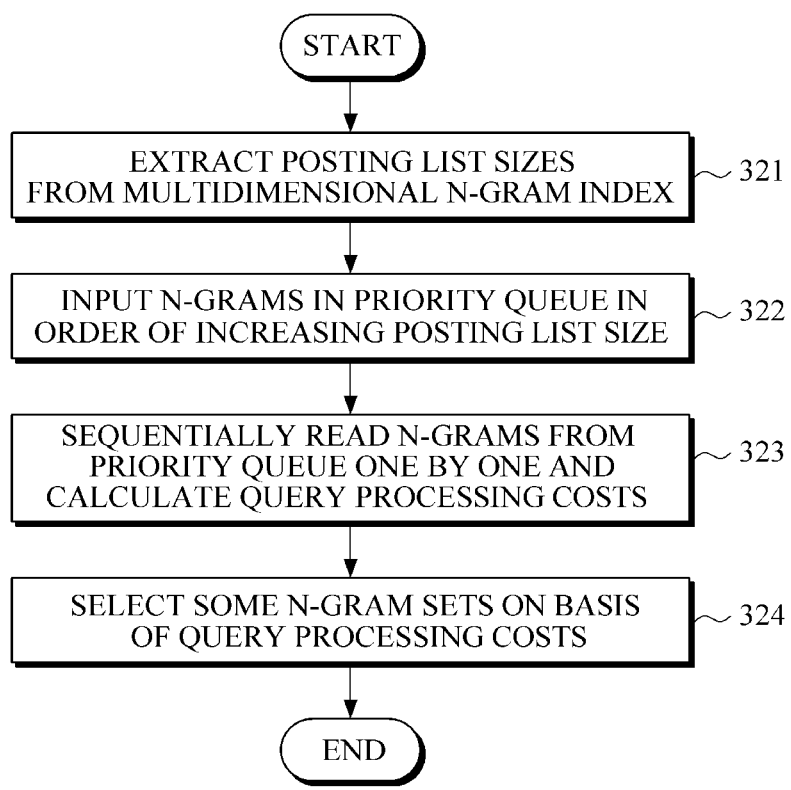
FIG. 7 is a flowchart illustrating an example of an n-gram set selection step.

FIG. 6 illustrates an example of a method for processing a multidimensional string query. FIG. 7 illustrates an example of an n-gram set selection step.

Referring to FIGS. 6 and 7, the n-gram set generator 130 splits a multidimensional query into n-grams according to respective attributes, and generates an overall n-gram set (310). As described with reference to FIGS. 1 and 5, a multidimensional query may be used to express periodic measurement results of a plurality of examination items (attributes), such as medical data, in a string of symbols. If a query is raised when a large amount of data, such as examination results of many patients, is managed as strings of simple symbols, the processing speed of the query may be remarkably increased.

Subsequently, the n-gram set selector 140 may select some n-gram sets from among all n-gram sets on the basis of posting list sizes which are included in the multidimensional n-gram index 120 (320). An example of the selection process is illustrated in FIG. 7.

Referring to FIG. 7, the n-gram set selector 140 extracts posting list sizes of all n-grams from the multidimensional n-gram index 120 (321). Then, the n-gram set selector 140 puts the n-grams in a priority queue in order of increasing posting list size (322).

Subsequently, the n-gram set selector 140 takes the n-grams out of the priority queue one by one and calculates query processing costs of the n-grams (323). For example, a query processing cost may be determined according to the number of times of access from a disk to a page of a document, that is, the number of pages in which the corresponding n-gram exists among all pages of the document. As another example, the query processing costs may be determined in consideration of cost for reading posting lists of each n-gram set so as to generate a candidate set or may be determined in consideration of cost for determining an answer document to the query on the basis of a candidate set. In response to the query processing costs of all the n-grams being calculated, an n-gram set having the minimum query processing cost is selected (324).

Referring again to FIG. 6, the candidate set generator 150 reads posting lists corresponding to the selected n-gram set from the n-gram index 120 and generates a candidate set (330). For example, the candidate set may be generated by joining the posting lists of the selected n-gram set.

The refinement processor 160 determines an answer document to the query of a user, that is, a document in which the query exists, on the basis of the candidate set (340). For example, the refinement processor 160 may compare actual queries in the candidate set documents of a document DB 170, thereby determining only the document in which the query exists.

Using the apparatus and method for processing a multidimensional string query according to the examples herein, search of a multidimensional multi-attribute string can be rapidly processed on the basis of a multidimensional n-gram index. Thus, a huge amount of data such as health examination data may be systematically classified and rapidly searched.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for processing a multidimensional string query, the apparatus comprising:
   an n-gram set generator configured to generate n-gram sets, for a multidimensional query of multi-attribute data;
   an n-gram set selector configured to select one or more n-gram sets from among the generated n-gram sets, based on posting list sizes, of a multidimensional n-gram index of multi-attribute data;
   a candidate set generator configured to generate a candidate set, by using posting lists corresponding to the selected n-gram sets; and
   a refinement processor configured to determine whether the multidimensional query is included in a document, based on the generated candidate set;
   wherein the multidimensional query comprises strings that are expressed in predetermined symbols, based on respective attributes; and
   wherein the predetermined symbols are designated to one or more respective sections, and wherein the one or more respective sections are obtained by dividing a range of an actual value of each of the attributes into the one or more respective sections.

2. The apparatus of claim 1, wherein the n-gram set selector is further configured to calculate query processing costs of the generated n-gram sets in order of increasing posting list size, and select the one or more n-gram sets, based on the query processing costs.

3. The apparatus of claim 2, wherein the query processing costs for a corresponding n-gram are determined according to a number of page access times to obtain pages from a disk.

4. The apparatus of claim 2, wherein the query processing costs are determined, based on: a cost for reading posting lists of each n-gram set, so as to generate the candidate set, or a cost for determining whether a document includes the multidimensional query, based on the candidate set.

5. The apparatus of claim 1, wherein the candidate set generator is configured to generate the candidate set, by joining the posting lists of one or more of the n-gram sets.

6. An apparatus for processing a multidimensional string query, the apparatus comprising:
   an n-gram set generator configured to generate n-gram sets, for a multidimensional query of multi-attribute data;
   an n-gram set selector configured to select one or more n-gram sets from among the generated n-gram sets, based on posting list sizes, of a multidimensional n-gram index of multi-attribute data;
   a candidate set generator configured to generate a candidate set, by using posting lists corresponding to the selected n-gram sets;
   a refinement processor configured to determine whether the multidimensional query is included in a document, based on the generated candidate set; and
   an n-gram index manager configured to generate and manage the multidimensional n-gram index,
   wherein the n-grams of the multidimensional n-gram index are expressed in predetermined symbols included in one or more respective sections, and wherein the one or more respective sections are obtained by dividing a range that an attribute value can have according to respective attributes.

7. A method of processing a multidimensional string query, the method comprising:
   generating n-gram sets, for a multidimensional query of multi-attribute data;
   selecting one or more n-gram sets from among the generated n-gram sets, based on posting list sizes, of a multidimensional n-gram index of multi-attribute data;
   generating a candidate set, by using posting lists corresponding to the selected n-gram sets; and
   determining whether the multidimensional query is included in a document, based on the candidate set;
   wherein the multidimensional query comprises strings that are expressed in predetermined symbols, based on respective attributes; and
   wherein the predetermined symbols are designated to one or more respective sections, and wherein the one or more respective sections are obtained by dividing a range of an actual value of each of the attributes into the one or more respective sections.

8. The method of claim 7, wherein the selecting the one or more n-gram sets comprises:
   extracting the posting list sizes from the multidimensional n-gram index;
   calculating query processing costs of the generated n-gram sets in order of increasing posting list size; and
   selecting the one or more n-gram sets, based on the query processing costs.

9. The method of claim 8, wherein the calculating of the query processing costs comprises:
   inputting n-grams in a priority queue in order of increasing posting list size; and
   sequentially reading the n-grams from the priority queue one by one and calculating the query processing costs.

10. The method of claim 8, wherein the query processing costs for a corresponding n-gram are determined according to a number of page access times to obtain pages from a disk.

11. The method of claim 8, wherein the query processing costs are determined in consideration of: a cost for reading posting lists of each n-gram set, so as to generate the candidate set, or a cost for determining whether a document includes the multidimensional query, based on the candidate set.

12. The method of claim 7, wherein generating the candidate set comprises generating the candidate set, by joining the posting lists of the one or more n-gram sets.

13. A method of processing a multidimensional string query, the method comprising:

generating n-gram sets, for a multidimensional query of multi-attribute data;

selecting one or more n-gram sets from among the generated n-gram sets, based on posting list sizes, of a multi-dimensional n-gram index of multi-attribute data;

generating a candidate set, by using posting lists corresponding to the selected n-gram sets; and determining whether the multidimensional query is included in a document, based on the candidate set;

wherein n-grams of the n-gram index are expressed in predetermined symbols designated to one or more respective sections, and wherein the one or more respective sections are obtained by dividing a range that an attribute value can have, based on respective attributes.

* * * * *